US012581275B2

(12) United States Patent
Song et al.

(10) Patent No.: US 12,581,275 B2
(45) Date of Patent: Mar. 17, 2026

(54) METHOD OF OPERATING A MESSAGE EXCHANGE SERVER RELATED TO V2X MESSAGE TRANSMISSION AND RECEPTION AND APPARATUS THEREFOR

(71) Applicant: LG ELECTRONICS INC., Seoul (KR)

(72) Inventors: Min Song, Seoul (KR); Bokyoung Sung, Seoul (KR); Donghwi Kim, Seoul (KR); Seongwoo Jeong, Seoul (KR); Hakseong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 422 days.

(21) Appl. No.: 18/111,110

(22) Filed: Feb. 17, 2023

(65) Prior Publication Data

US 2024/0284147 A1 Aug. 22, 2024

(51) Int. Cl.
*H04W 4/12* (2009.01)
*H04L 67/55* (2022.01)
*H04W 4/40* (2018.01)

(52) U.S. Cl.
CPC .............. *H04W 4/12* (2013.01); *H04L 67/55* (2022.05); *H04W 4/40* (2018.02)

(58) Field of Classification Search
CPC ........... H04W 4/12; H04W 4/40; H04W 4/42; H04W 4/44; H04W 4/46; H04W 4/48; H04L 67/55
See application file for complete search history.

(56) References Cited

U.S. PATENT DOCUMENTS

| | | | | |
|---|---|---|---|---|
| 2007/0041346 A1* | 2/2007 | Bae | .................... | H04W 36/0033 |
| | | | | 370/331 |
| 2020/0177461 A1* | 6/2020 | Zhu | .......................... | G06F 15/16 |
| 2020/0260511 A1* | 8/2020 | Kim | ........................ | H04W 4/44 |
| 2021/0099848 A1 | 4/2021 | Ruan et al. | | |
| 2022/0095152 A1* | 3/2022 | Szilagyi | ................. | H04L 67/12 |
| 2022/0116465 A1* | 4/2022 | Descombes | ........ | G06Q 30/0259 |
| 2022/0408214 A1* | 12/2022 | Song | ....................... | H04W 4/12 |
| 2023/0067429 A1* | 3/2023 | Liu | ....................... | H04W 36/08 |
| 2024/0039982 A1* | 2/2024 | Merwaday | .............. | H04L 67/10 |

* cited by examiner

*Primary Examiner* — Jeong S Park

(74) *Attorney, Agent, or Firm* — Birch, Stewart, Kolasch & Birch, LLP

(57) ABSTRACT

A method of operating a message exchange server related to vehicle-to-everything (V2X) message transmission and reception in a wireless communication system can include obtaining, by the message exchange server, information of an adjacent message exchange server from a lookup server; and receiving, by the message exchange server, a message published by a User Equipment (UE). Also, in response to determining, by the message exchange server, that a topic included in the message published by the UE is not included in a topic list of the message exchange server, the method can further include transmitting, by the message exchange server, a handover message to the UE.

17 Claims, 16 Drawing Sheets

FIG. 2

FIG. 3
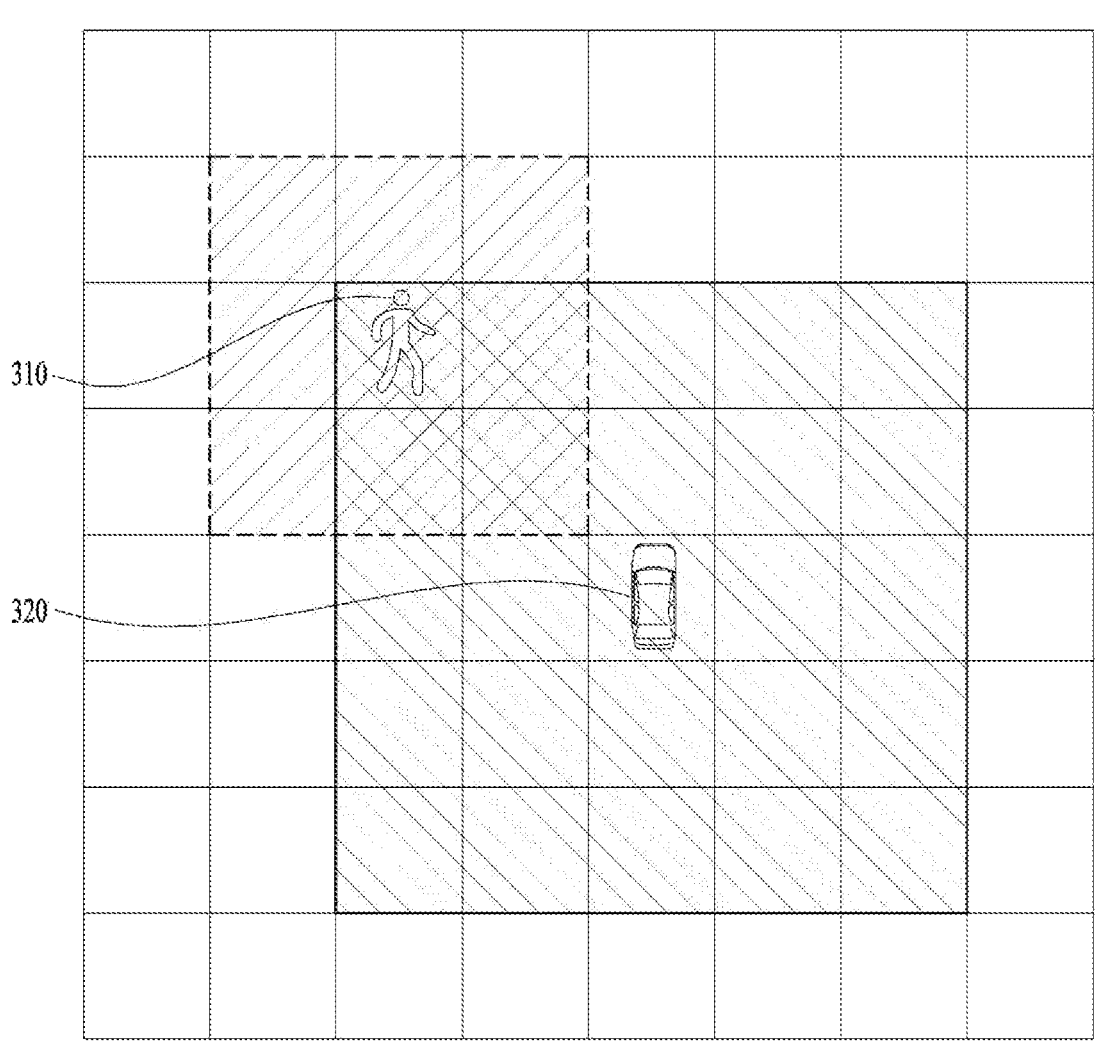
310
320
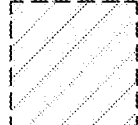 : First subscription area
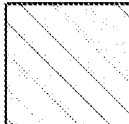 : Second subscription area

FIG. 4

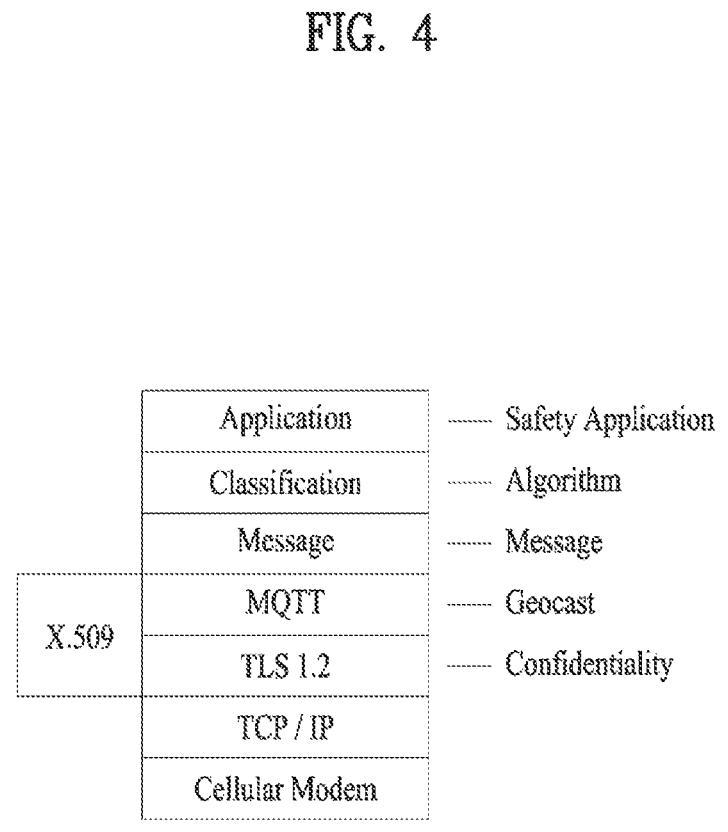

| | |
|---|---|
| Application | ⎯⎯ Safety Application |
| Classification | ⎯⎯ Algorithm |
| Message | ⎯⎯ Message |
| MQTT | ⎯⎯ Geocast |
| TLS 1.2 | ⎯⎯ Confidentiality |
| TCP / IP | |
| Cellular Modem | |

* Soft V2X Specific Control Packet

| Bit | 7 | 6 | 5 | 4 | 3 | 2 | 1 | 0 |
|---|---|---|---|---|---|---|---|---|
| Fixed Header | MQTT Control Packet Type (Soft V2X Specific Control Packet Type = 0) | | | | Reserved | | | |
| | Remaining Length | | | | | | | |
| Variable Header | Soft V2X Specific Command (0 ~ 255) | | | | | | | |
| | Properties (depend on Soft V2X Specific Command) | | | | | | | |
| Payload | Payload (depend on Soft V2X Specific Command) | | | | | | | |

( a )

* Soft V2X Specific Control Packet - HANDOVER Command

| Bit | 7 | 6 | 5 | 4 | 3 | 2 | 1 | 0 |
|---|---|---|---|---|---|---|---|---|
| Fixed Header | MQTT Control Packet Type (Soft V2X Specific Control Packet Type = 0) | | | | Reserved | | | |
| | Remaining Length | | | | | | | |
| Variable Header | Soft V2X Specific Command (HANDOVER = 1) | | | | | | | |
| | Properties (Property Length = 0) | | | | | | | |
| Payload | Hand over Message Broker Information (UTF-8 Encoded) | | | | | | | |

( b )

FIG. 10
1) Message Brokers Topics without overlapping
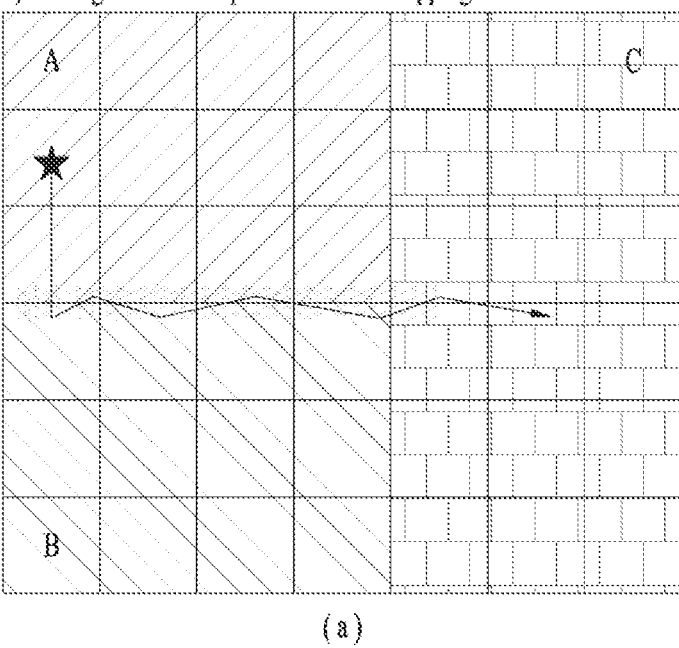
(a)
2) Message Brokers Topics with overlapping
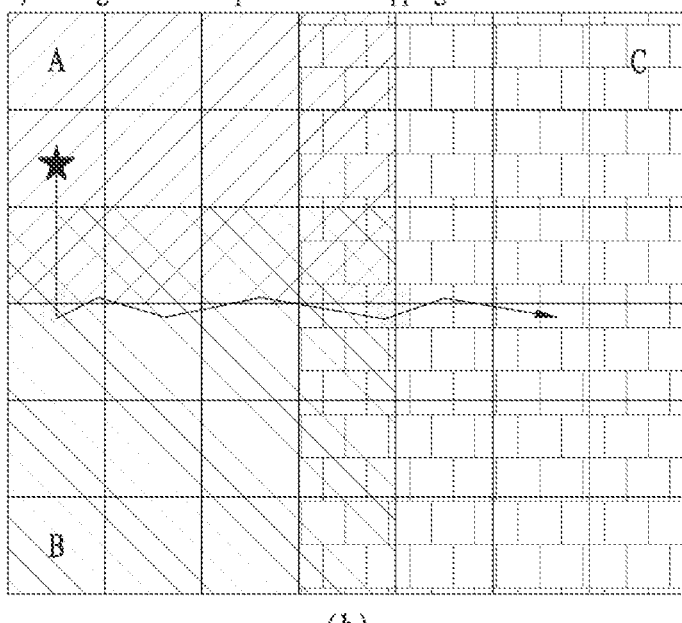
(b)

FIG. 11
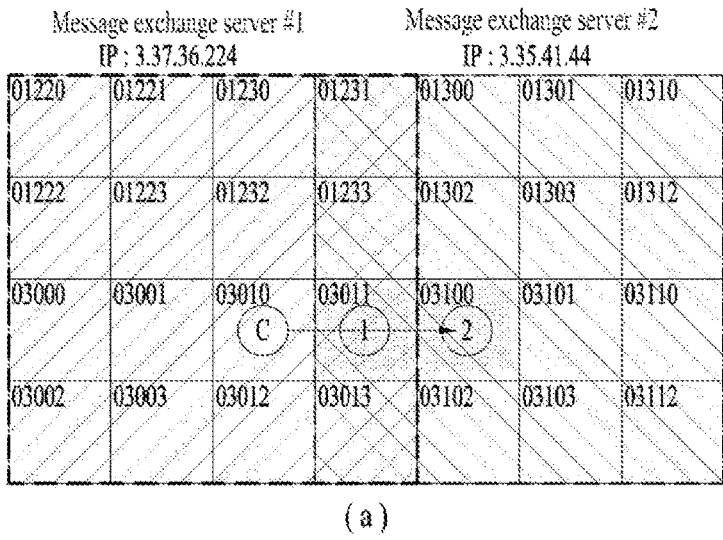
(a)
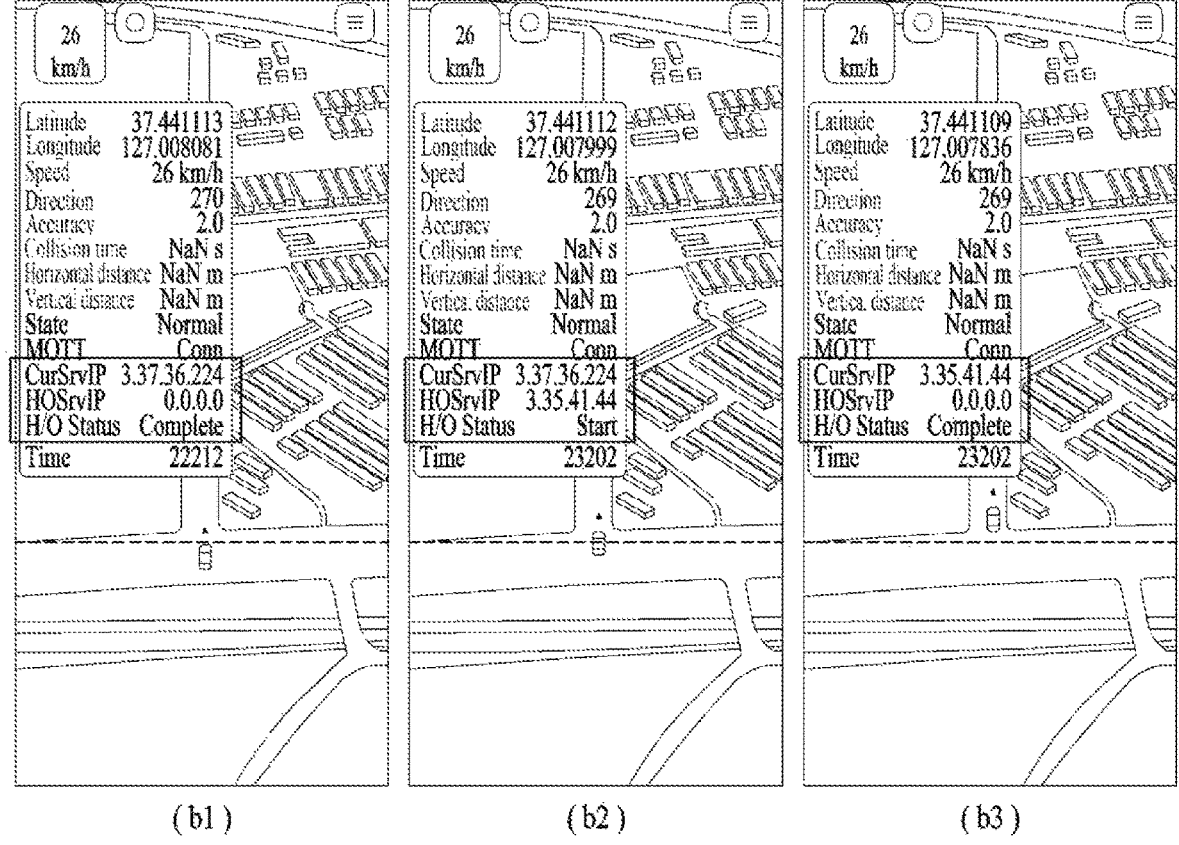
(b1)                    (b2)                    (b3)

FIG. 12

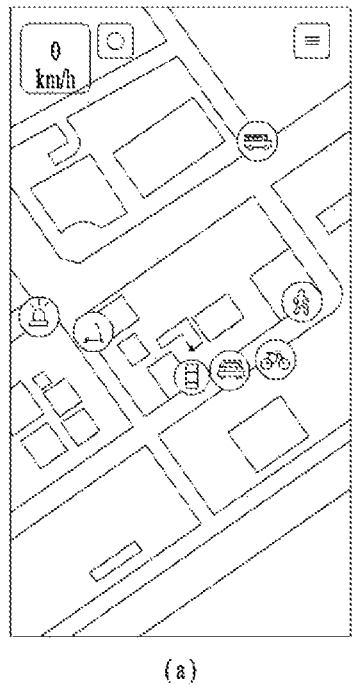

(a)

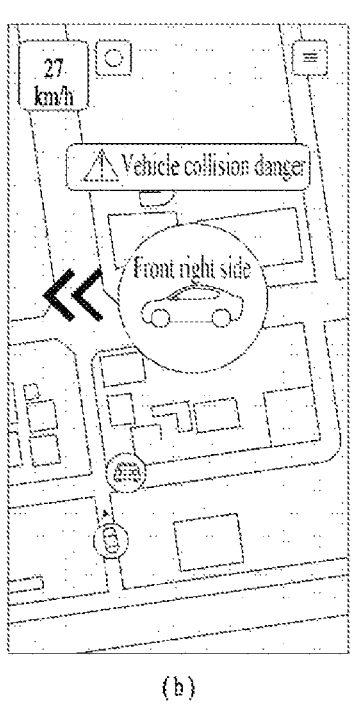

(b)

| < | Developer option | | < | Developer option | | < | Developer option | |
|---|---|---|---|---|---|---|---|---|
| COMMON | APP | LOG | COMMON | APP | LOG | COMMON | APP | LOG |

(c)

GEOCAST : zoom level
19 Level

GEOCAST : subs. area
25 Area

Host IP Address
10.51.54.150

GEOCAST : subs. area
9

Cancel  Confirm

(d)

GEOCAST : zoom level
19 Level

GEOCAST : subs. area
25 Area

Host IP Address
10.51.54.150

GEOCAST : subs. area
25

Cancel  Confirm

(e)

GEOCAST : zoom level
19 Level

GEOCAST : subs. area
25 Area

Host IP Address
10.51.54.150

GEOCAST : zoom level
19

Cancel  Confirm (c)          (d)          (e)

FIG. 16

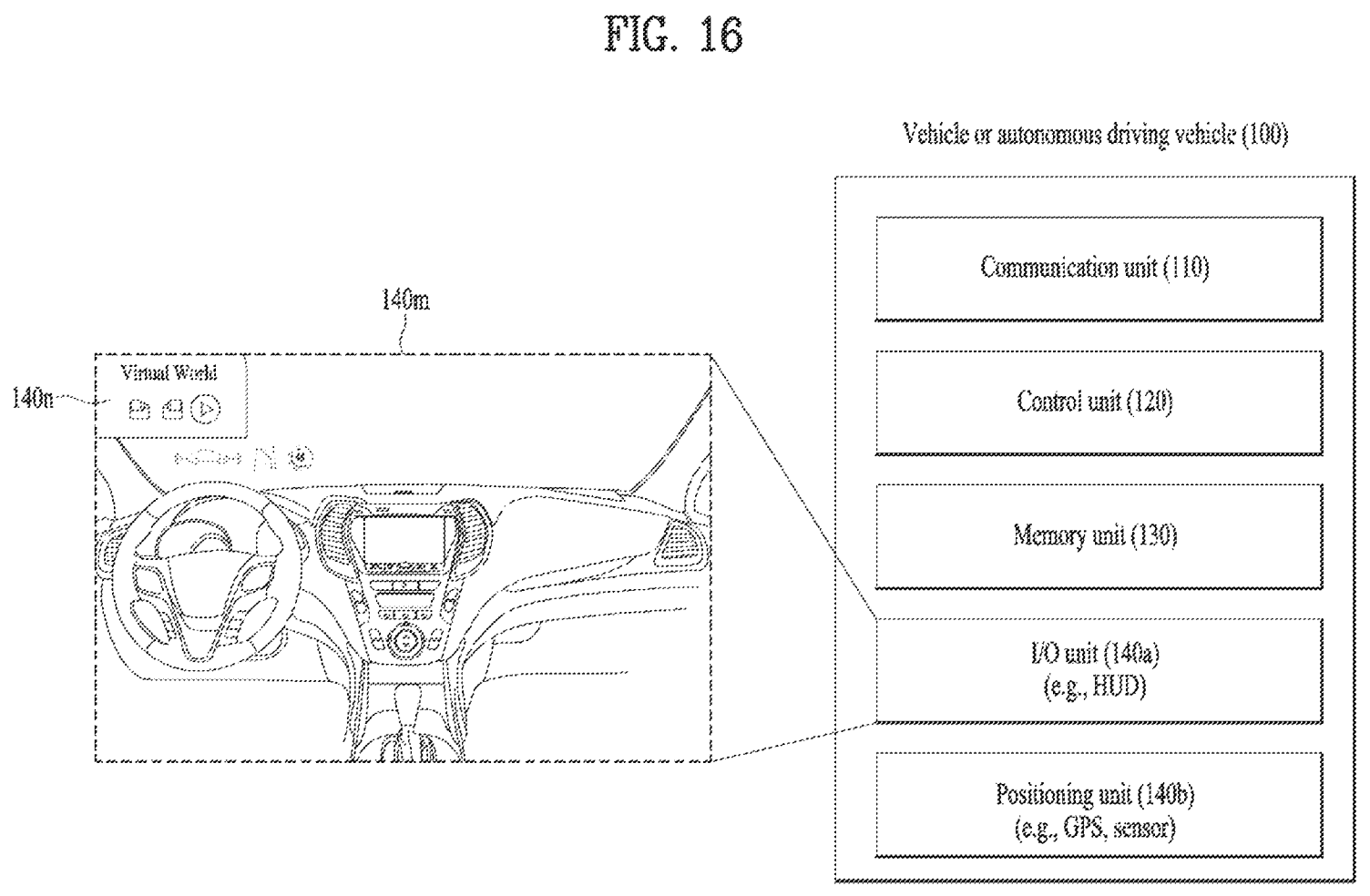

Vehicle or autonomous driving vehicle (100)

Communication unit (110)

Control unit (120)

Memory unit (130)

I/O unit (140a)
(e.g., HUD)

Positioning unit (140b)
(e.g., GPS, sensor)

140n

140a

Visual Width

METHOD OF OPERATING A MESSAGE EXCHANGE SERVER RELATED TO V2X MESSAGE TRANSMISSION AND RECEPTION AND APPARATUS THEREFOR

BACKGROUND OF THE DISCLOSURE

Technical Field

The following disclosure relates to a wireless communication system, and more particularly, to a method and apparatus for operating a message exchange server and user equipment related to V2X message transmission/caption for Vehicle-To-Everything (V2X) services or Soft V2X services.

Discussion of Related Art

Wireless communication systems are being widely deployed to provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system, and a multi carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as a solution of relieving the base station (BS) of the constraint of rapidly growing data traffic.

Vehicle-to-everything (V2X) is a communication technology in which a vehicle exchanges information with another vehicle, a pedestrian, and infrastructure by wired/wireless communication. V2X may be categorized into four types: vehicle-to-vehicle (V2V), vehicle-to-infrastructure (V2I), vehicle-to-network (V2N), and vehicle-to-pedestrian (V2P). V2X communication may be provided via a PC5 interface and/or a Uu interface.

As more and more communication devices demand larger communication capacities, there is a need for enhanced mobile broadband communication relative to existing radio access technologies (RATs). Accordingly, a communication system is under discussion, for which services for UEs sensitive to reliability and latency issues are considered. The next-generation RAT in which evolved mobile broadband (eMBB), machine-type communication (MTC), and ultra-reliable, low-latency communication (URLLC) are considered is referred to as new RAT or new-radio (NR) communication. In NR, V2X communication may also be supported.

SUMMARY OF THE DISCLOSURE

Technical Task

Technical tasks of embodiments of the present disclosure are to provide a method of operating a message exchange server and a UE with respect to a method for the UE to move a management area between servers in a situation where the respective servers are distributively disposed in SoftV2X.

Technical Solutions

In one technical aspect of the present disclosure, provided is a method of operating a message exchange server related to V2X message transmission and reception in a wireless communication system, the method including obtaining information of an adjacent message exchange server from a lookup server by the message exchange server, receiving by the message exchange server a message published by a User Equipment (UE), and determining by the message exchange server whether a topic included in the message is included in a topic list of the message exchange server, in which based on the topic included in the message not being included in the topic list of the message exchange server, the message exchange server can transmit a handover message to the UE.

In another technical aspect of the present disclosure, provided is a message exchange server related to V2X message transmission/reception in a wireless communication system, the message exchange server including at least one processor and at least one computer memory operably connected to the at least one processor and storing instructions to enable the at least one processor to perform operations when executed, the operations including obtaining information of an adjacent message exchange server from a lookup server by the message exchange server, receiving by the message exchange server a message published by a User Equipment (UE), and determining by the message exchange server whether a topic included in the message is included in a topic list of the message exchange server, in which based on the topic included in the message not being included in the topic list of the message exchange server, the message exchange server can transmit a handover message to the UE.

In a further technical aspect of the present disclosure, provided is a User Equipment (UE) related to V2X message transmission and reception in a wireless communication system, the UE including a transmitting unit publishing a message including a topic, a receiving unit receiving a handover message from a message exchange server having received the message, and a display unit displaying an IP of a server to hand over thereto based on the reception of the handover message, in which the handover message is received based on the topic included in the message not being included in a topic list of the message exchange server having received the message.

The handover message can include information of the message exchange server corresponding to the topic included in the message.

Irrespective of whether the topic included in the message is not included in the topic list of the message exchange server, the message exchange server can forward the message to UEs subscribing to the topic.

Topics included in the topic list can be included in a management area of the message exchange server.

The message exchange server and the adjacent message exchange server can share one or more topics at a boundary between management areas of the message exchange server and the adjacent message exchange server.

The information of the adjacent message exchange server can include the topic list of the adjacent message exchange server.

The topic can be calculated by the UE based on a current location of the UE.

The message can include a Message Queuing Telemetry Transport (MQTT) Control Packet set as Reserved Control Packet Type=0.

The MQTT Control Packet can include a Soft V2X specific command in Variable Header.

The handover message can include a HANDOVER Command field set to 1 in Variable Header.

Advantageous Effects

According to one embodiment of the present disclosure, in a situation where a large-scale V2X service is provided using distributed servers, when a UE moves from one server management area to a management area of an adjacent server, a seamless service can be provided which also reduces power consumption and reduces the amount of control messages that are exchanged.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure.

FIG. 2 is a diagram showing an example of a quadtree used tile according to an embodiment of the present disclosure.

FIG. 3 shows one example of setting a subscription area according to an embodiment of the present disclosure.

FIG. 4 is a diagram showing a SoftV2X protocol stack according to an embodiment of the present disclosure.

FIGS. 6 to 12 are diagrams to describe embodiments of the present disclosure; and FIGS. 13 to 16 are diagrams illustrating various devices and examples according to embodiments of the present disclosure.

DETAILED DESCRIPTION OF THE EMBODIMENTS

Figure 1:
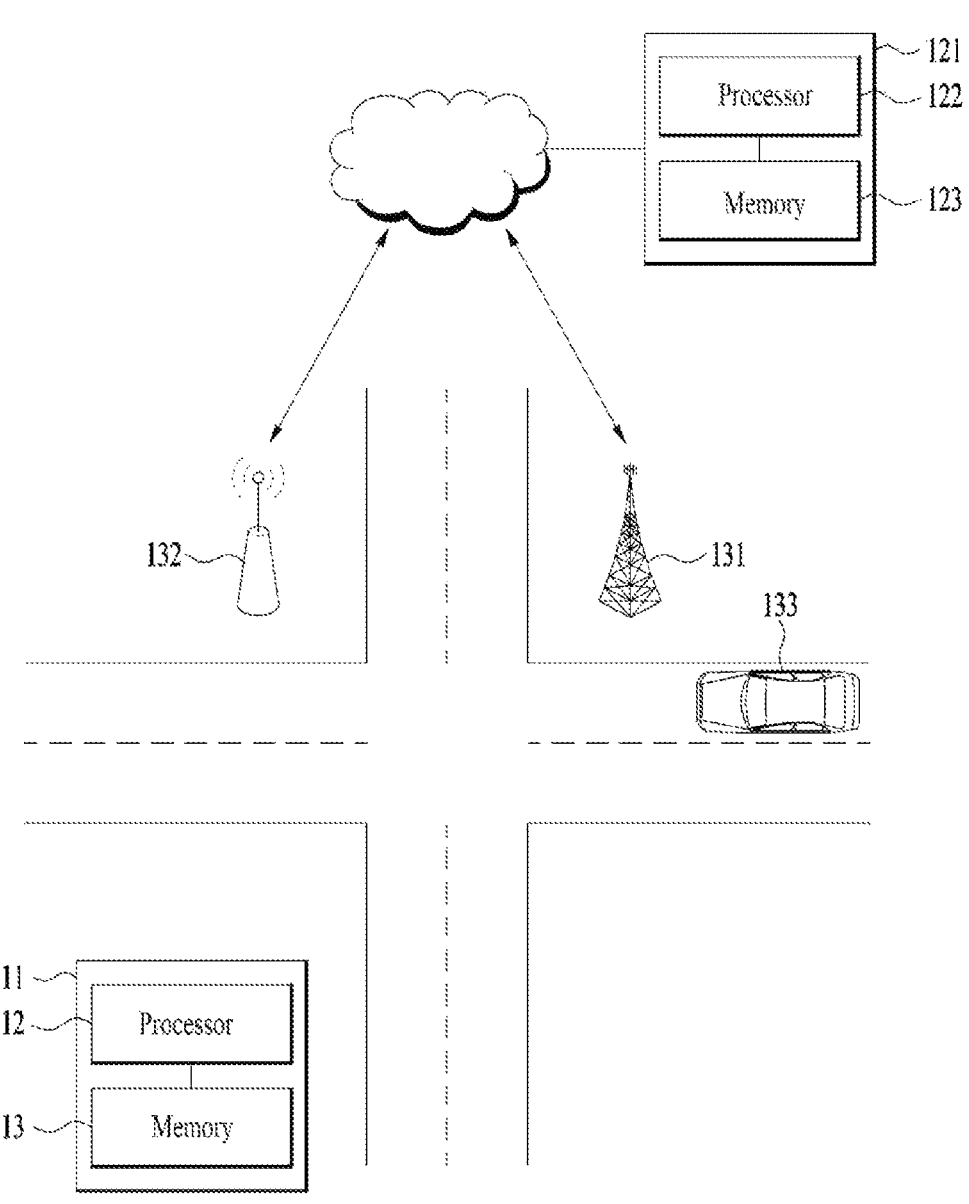
FIG. 1 is a diagram showing a system according to an embodiment of the present disclosure.

Hereinafter, the embodiments disclosed in the present specification will be described in detail with reference to the accompanying drawings, but the same or similar components are assigned the same reference numbers regardless of reference numerals, and redundant description thereof will be omitted. The suffixes "module" and "unit" for the components used in the following description are given or mixed in consideration of only the ease of writing the specification, and do not have distinct meanings or roles by themselves. In addition, in describing the embodiments disclosed in the present specification, if it is determined that detailed descriptions of related known technologies may obscure the gist of the embodiments disclosed in the present specification, the detailed description thereof will be omitted. In addition, the accompanying drawings are only for easy understanding of the embodiments disclosed in the present specification, and the technical ideas disclosed in the present specification are not limited by the accompanying drawings.

Terms including an ordinal number, such as first, second, etc., may be used to describe various elements, but the elements are not limited by the terms. The above terms are used only for the purpose of distinguishing one component from another.

When an element is referred to as being "connected" or "coupled" to another element, it is understood that it may be directly connected or coupled to the other element, but other elements may exist in between. On the other hand, when it is mentioned that a certain element is "directly connected" or "directly coupled" to another element, it should be understood that no other element is present in the middle.

The singular expression includes the plural expression unless the context clearly dictates otherwise.

In the present application, terms such as "comprises" or "have" are intended to designate that the features, numbers, steps, operations, components, parts, or combinations thereof described in the specification exist, but it is to be understood that this does not preclude the possibility of addition or existence of one or more other features, numbers, steps, operations, components, parts, or combinations thereof.

A vehicle according to an embodiment of the present specification can be or is defined as a means of transport traveling on a road or track. Vehicles can include automobiles, ships, aircraft, trains, motorcycles, bicycles, and the like. The vehicle can include an internal combustion engine vehicle having an engine as a power source, a hybrid vehicle having an engine and an electric motor as a power source, an electric vehicle having an electric motor as a power source, and combinations thereof.

A vehicle-to-everything (V2X) device according to an embodiment of the present specification can refer to a device that provides V2X functions and V2X services to users based on software, and can also be referred to as a SoftV2X device. The V2X device can be implemented based on hardware and/or software in an electronic device operated by a user such as User Equipment (UE), mobile station (MS), mobile terminal (MT), user terminal (UT), cellular phone, laptop, handheld device, tablet, drone, consumer electronics, and the like. The V2X device can be mounted on a vehicle or electronic device as an on-board unit (OBU) to provide V2X functions and services to the vehicle. A V2X device disposed inside or outside the vehicle can be connected to the vehicle through a wireless interface to provide V2X functions and V2X services to the vehicle.

In various embodiments of the present disclosure, "/" and "," should be interpreted as "and/or." For example, "A/B" can mean "A and/or B." Further, "A, B" can mean "A and/or B." Further, "A/B/C" can mean "at least one of A, B and/or C." Further, "A, B, C" can mean "at least one of A, B and/or C."

In various embodiments of the present disclosure, "or" should be interpreted as "and/or." For example, "A or B" can include "only A," "only B," and/or "both A and B." In other words, "or" should be interpreted as "additionally or alternatively."

FIG. 1 is a diagram showing a system having the present disclosure applied thereto.

Referring to FIG. 1, the system includes a UE 111 (or a V2X equipment/device) and a server 121 (or a V2X server). The UE 111 can communicate with the server 121 through a base station 131 or a Road Side Unit (RSU) device 132. The UE 111 can communicate with the base station 131, the Road Side Unit (RSU) device 132, a neighbor vehicle 133, and/or a neighbor UE using a wireless communication protocol. There is no limit to wireless communication protocols, including, for example, Dedicated Short Range Communications (DSRC), Cellular-V2X (C-V2X), Wi-Fi, BLU- ETOOTH, and/or 3$^{rd}$ Generation Partnership Project (3GPP) based Cellular Communication Protocol (e.g., Wideband Code Division Multiple Access (WCDMA), Long Term Evolution (LTE), New Radio (NR), etc.).

The server 121 receives one or more V2X messages from the UE 111 in a managed area. The server 121 can forward the one or more collected V2X messages to the UE 111 that is a current subscriber.

The V2X message is a message that is periodically or aperiodically transmitted by the UE 111 (or RSU device 132) to the server 121 and provides state information of the UE 111 (or a device managed by the RSU device 132). For example, the UE 111 can transmit 10 V2X messages per second. The server 121 collects V2X messages from a multitude of UEs and forwards the V2X messages to the subscribing UE.

The following table shows an example of information elements included in the V2X message. Not all information elements are essential, and the name is just an example. Information elements can be added/changed/deleted depending on the policy or situation.

TABLE 1

| Name | Description |
|------|-------------|
| V2X ID | Temporary Identifier (ID) for identifying UE that transmits this message. This can be randomly selected by UE and periodically changed. The size can be 4 octets. |
| Position | Indicates the location of UE. This can include Latitude, Longitude, and Elevation. |
| (Positional Accuracy | Includes quality of various parameters used to model the accuracy of positioning. |
| Velocity | Indicates the speed of UE. |
| Heading | Indicates the current heading (direction of motion) of UE. |
| Path History | Defines a geometric path reflecting UE's movement over some period of time and/or distance |
| Acceleration | Indicates acceleration of UE. This can include a set of acceleration values for three orthogonal directions of UE: longitude axis, lateral axis, and vertical axis. |
| Device type | Indicates the type of UE. Examples: Pedestrians, vehicles, bicycles, etc. |
| Publishing area | Area where the UE sends V2X messages to the server. Publishing area includes one or more tiles at each level. |

A V2X message transmitted by the UE 111 to the server 121 is referred to as an Uplink (UL) V2X message, and a V2X message transmitted by the server 121 to the UE 111 is referred to as a Downlink (DL) V2X message.

The UE 111 can include a processor 112 and a memory 113. The processor 112 implements the function of the UE 111 and can include one or more software modules. The UE 111 can further include various additional devices according to functions such as a display, a user interface, a wireless modem, etc.

The server 121 includes computing hardware connected to the one or more base stations 131 and/or the RSU device 132 to provide V2X functions and services to UE 111. The server 121 can be a Mobile/multi-access Edge Computing (MEC)-based server or a centralized server. The server 121 can be referred to as another name such as a geocast server, a soft server, etc. The server 121 can include a processor 122 and a memory 123. The processor 122 implements a function of the server 121 and can include one or more software modules.

The processor 112/122 can include Application-Specific Integrated Circuit (ASIC), Central Processing Unit (CPU), Application Processor (AP), Digital Signal Processors (DSPs), Digital Signal Processing Devices (DSPDs), Programmable Logic Devices (PLDs), Field Programmable Gate Arrays (FPGAs), microcontroller, chipset, logic circuit, data processor, and/or combinations thereof. In software implementation for the following embodiments, software codes for performing the functions described herein can be stored in the memory 113/123 and processed by the processor 112/122.

The memory 113/123 can store information accessible by the processor 112/122. The information can include instructions executable by the processor 112/122 and/or data processed by the processor. The memory 113/123 can include some form of computer-readable medium that operates to store information. For example, the memory 113/123 can include Read Only Memory (ROM), Random Access Memory (RAM), Digital Video Disc (DVD), optical disc, flash memory, Solid State Drive (SSD), hard drive, and combinations thereof.

Message Queuing Telemetry Transport (MQTT) is used as a message protocol between the UE 111 and the server 121, but this is only an example. Advanced Message Queuing Protocol (AMQP), Hypertext Transfer Protocol (HTTP), and/or vendor specific protocols can be used.

Now, the setting of an area for a V2X service will be described in more detail. Hereinafter, a tile refers to a geographical basic unit for setting a subscription area. Hereinafter, a quadrangle is shown as a tile shape, which is just an example. There are no restrictions on the shapes of tiles such as polygons, circles, etc.

Figure 2:
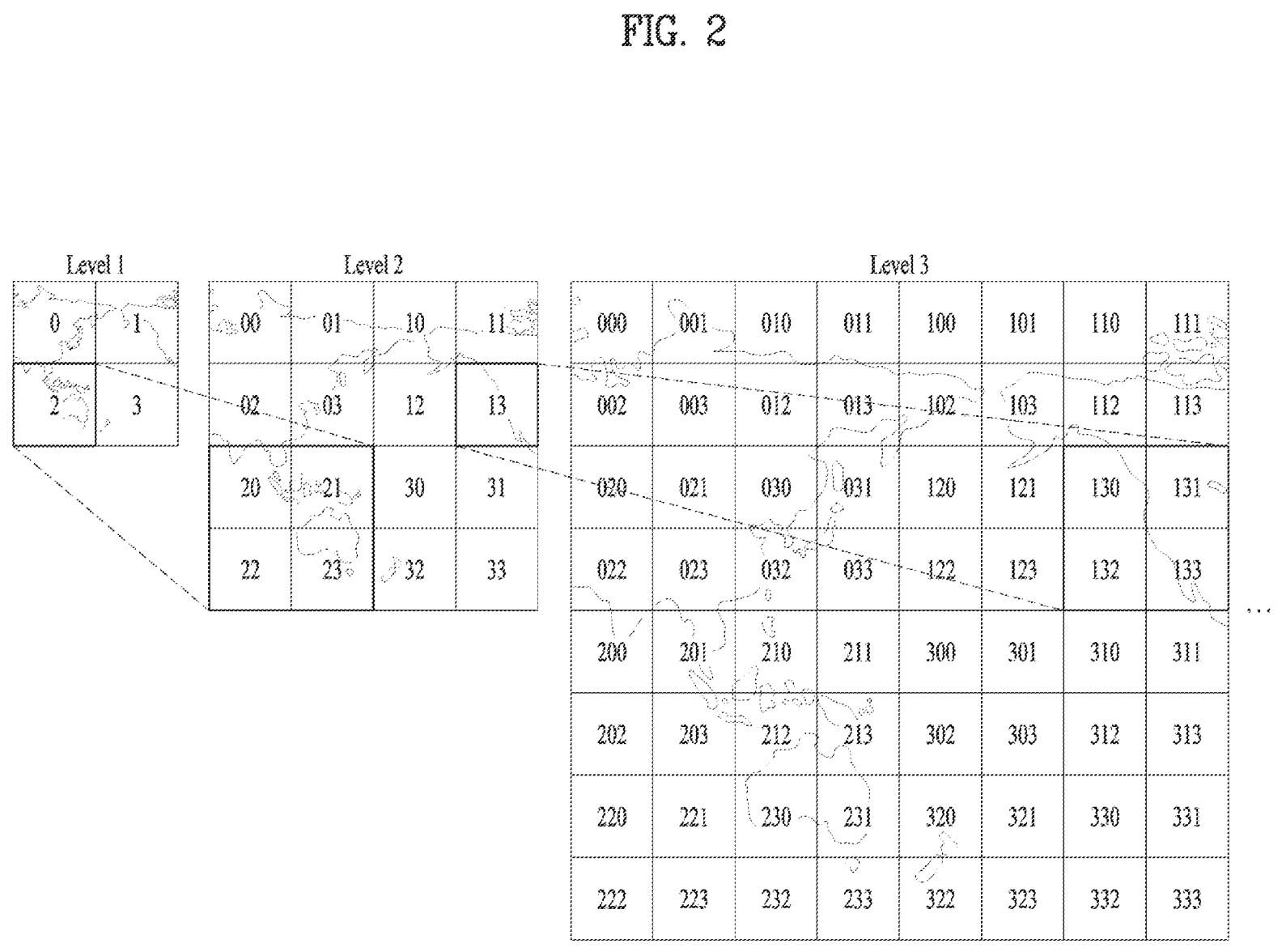

FIG. 2 is a diagram showing an example of a quadtree used tile.

Referring to FIG. 2, the quadtree represents a partition of space in two dimensions by decomposing a map (e.g., world map) into four equal quadrants, subquadrants, and so on. A size of the quadrant varies according to a zoom level, and each quadrant corresponds to a tile. Here, the situations are shown where the levels are 1, 2, and 3. The larger the level, the smaller the size of the tile. At each level, a unique identifier is assigned to a tile. A tile ID can have the bit number corresponding to a level. For example, each internal node in the quadtree can have four children.

A UE can obtain an ID of a tile in which the UE is located based on its location information (e.g., latitude and longitude). The UE and/or server can adjust a size of an area by adjusting a level according to a situation.

In the following embodiment, areas for a V2X service are as follows.

Management area: An area managed by a server when one or more servers distributively manage an area to serve large-scale users or a large area. The management area includes one or more tiles.

Subscription area: An area where a UE has subscribed to a server. The subscription area can be referred to by other names such as a concerned area, an impact area, a geocast area, etc. The subscription area includes one or more tiles. The subscription area can be included in one management area, or can be defined over a plurality of management areas by a plurality of servers.

Publishing area: An area where a UE transmits a V2X message to a server. The publishing area can include one or more tiles at each level. The publishing area can indicate a tile in which the UE is currently located. A part or all of the publishing area can overlap the subscription area.

FIG. 3 shows one example of setting a subscription area.

Referring to FIG. 3, a first subscription area is set for a first UE 310 (e.g., the leftward sloping hashing around the person associated with first V2X device 310), and a second subscription area is set for a second UE 320 (e.g., the rightward sloping hashing around the vehicle associated with/corresponding to second V2X device 320). Each of the UEs can periodically or aperiodically set/change/delete the subscription area (e.g., when its location is changed). Each of the UEs can request the server to set/change/delete the subscription area.

In this example, number of tiles included in the first subscription area is 9, and the number of tiles included in the second subscription area is 25, but there is no limit to the number of tiles included in the subscription area or the shape of the subscription area. The subscription area can include a tile in which the UE is located. Alternatively, the subscription area can include one or more tiles except for the tils in which the UE is located.

The first UE 310 can generate a first V2X message and periodically transmit the first V2X message to a server. The second UE 450 can generate a second V2X message and periodically transmit the second V2X message to the server.

The server can forward one or more V2X messages received in or around the subscription area to the UE associated with the subscription area.

A device for setting a subscription area can be referred to as a 'subscriber device'. A device for transmitting a V2X message to a server can be referred to as a 'publisher device'. A UE can be a subscriber device, a provider device, or both a subscriber device and a provider device. The server can forward V2X messages transmitted by provider devices in a management area to the subscriber device.

The server can deliver a V2X message of the provider device 'associated' with a subscription area of the subscriber device to the subscriber device. The provider device associated with the subscription area of the subscriber device can be referred to as a 'subscribed provider device'. The provider device associated with the subscription area of the subscriber device can satisfy at least one of the following conditions (i) to (iii), which include: (i) some or all of the publishing area of the provider device overlaps the subscription area of the subscriber device; (ii) some or all of the subscription area of the provider device overlap the subscription area of the subscriber device; and/or (iii) a location where the provider device transmits the V2X message is within the subscription area of the subscriber device.

According to the condition (i) or (iii), the server delivers a V2X message received within the first subscription area to the first UE 310. The server delivers a V2X message received in the second subscription area to the second UE 320.

Since the first UE 310 is located in the second subscription area, the server can forward the first V2X message to the second UE 320. The second UE 320 is a subscriber device, and the first UE 310 becomes a subscribed provider device.

Since the second UE 320 is not located in the first subscription area (which means that the condition (i) or the condition (iii) is not satisfied), the server does not forward the second V2X message to the first UE 310 (e.g., the person is in the vehicle's subscription area so the vehicle can receive V2X messages from the person, but the vehicle is not in the person's subscription area just yet so the person may not receive V2X messages from the vehicle, according to some situations or configurations). In other words, different areas or zones can be set for the first V2X device 310 and second V2X device 320, so that the second V2X device 320 is aware of the first V2X device 310, but the first V2X device 310 may not yet be aware of the second V2X device 320, since the first V2X device 310 has a much smaller subscription area. The second UE 320 is not a provider device of the first UE 310. However, if condition (ii) is considered, the second UE 320 can be a provider device of the first UE 310 (e.g., even if conditions (i) and (iii) are not met, the server can be configured to still deliver a message from the second V2X device to the first V2X device when condition (ii) is met).

FIG. 4 is a diagram showing a SoftV2X protocol stack operable in a UE, a smartphone, etc. Each layer of the SoftV2X protocol stack will be described with reference to FIG. 4. Here, SoftV2X is one V2X communication method in which a method described below is used, and the following description is not limited to the term SoftV2X. In addition, other terms referring to a communication method corresponding to the following description can also be considered as corresponding to SoftV2X in the present disclosure.

Cellular Modem is a layer (e.g., physical layer or media layer) for a modem that uses cellular networks. A cellular network is a communication network configured and operated by dividing an area into several cells, where a cell means a divided area including a single base station. Cellular network communication technology can include 5G New RAT (NR), Long Term Evolution (LTE), and the like. In SoftV2X, unicast communication is performed unlike in the situation of V2X.

In SoftV2X protocol, a network/transport layer uses IP/TCP used for cellular networks.

Transport Layer Security (TLS) layer is intended to ensure confidentiality using transport layer security, and an authentication certificate uses X.509, a Public Key-based (PKI) ITU-T standard. In addition, SoftV2X protocol is configured to perform the geocast function of sending messages only to users in a specific area. To this end, Message Queuing Telemetry Transport (MQTT), which is an issue-subscription-based messaging protocol, is used.

Subsequently, SoftV2X uses the message defined in SAE J2735 (BSM, PSM, RSA, etc.). SAE J2735 defines signal specifications such as messages, data frames, element formats, structures and the like for V2V/V2I communication, and the main messages are shown in Table 2 below.

TABLE 2

| Main Messages | Use range | Contents |
|---|---|---|
| BSM (Basic Safety Message) | V2V | Provides overall safety-related information. Broadcasting communications with periodicity of 100 ms. |
| PVD (Probe Vehicle Data) | V2I | Delivers 'Prove data' collected on a vehicle to RSU. |
| MapData | I2V | Provides information on intersections and road topographic data. |
| SPaT (SinglePhaseAndTiming) | I2V | Used in conjunction with MapData to provide information on signal phase and time synchronization of movement at the intersection. |

TABLE 2-continued

| Main Messages | Use range | Contents |
| --- | --- | --- |
| RTCMCorrections (Real-Time Differential Correction Maritime) | I2V | Message to provide RTCM correction information. |
| PSM (PersonalSafetyMessage) | V2P | Provides information about pedestrians in danger range. |
| PDM (ProveDataManagement) | I2V | Message for managing PVD messages. |
| RSA (RoadSideAlert) | V2X | Supports generation of ad-hoc message from public safety vehicle and RSU. |
| SSM (SignalStatusMessage) | I2V | Used for response to Facility Operational Status Request. |
| SRM (SignalRequestMessage) | V2I | Message for vehicle entering intersection to obtain service information from signal controller. |
| TIM (TravelerInformationMessage) | I2V | Message that conveys information on various traffic information, unexpected situations, pre-road work, etc. |
| CSR (CommonSafetyRequest) | V2V | Request message for data support for safety information exchange. |
| EVA (EmergencyVehicleAlert) | V2X | Deliver information about emergency vehicle. |
| ICA (IntersectionVehicleAlert) | V2X | Deliver information about vehicle hazard conditions near intersections. |
| NMEACorrections | I2V | Used for transmitting message of initial GPS data format on DSRC channel. |
| testMessages00-15 | N/A | Used in customized message format for each use region. |
| Not Assigned | N/A | Assigned when adding new message content. |

Subsequently, a classification layer performs an algorithm to generate data necessary for risk determination. An application layer determines whether or not it is dangerous based on the data that raised Classification, thereby informing pedestrians and drivers carrying smartphones.

Figure 5:
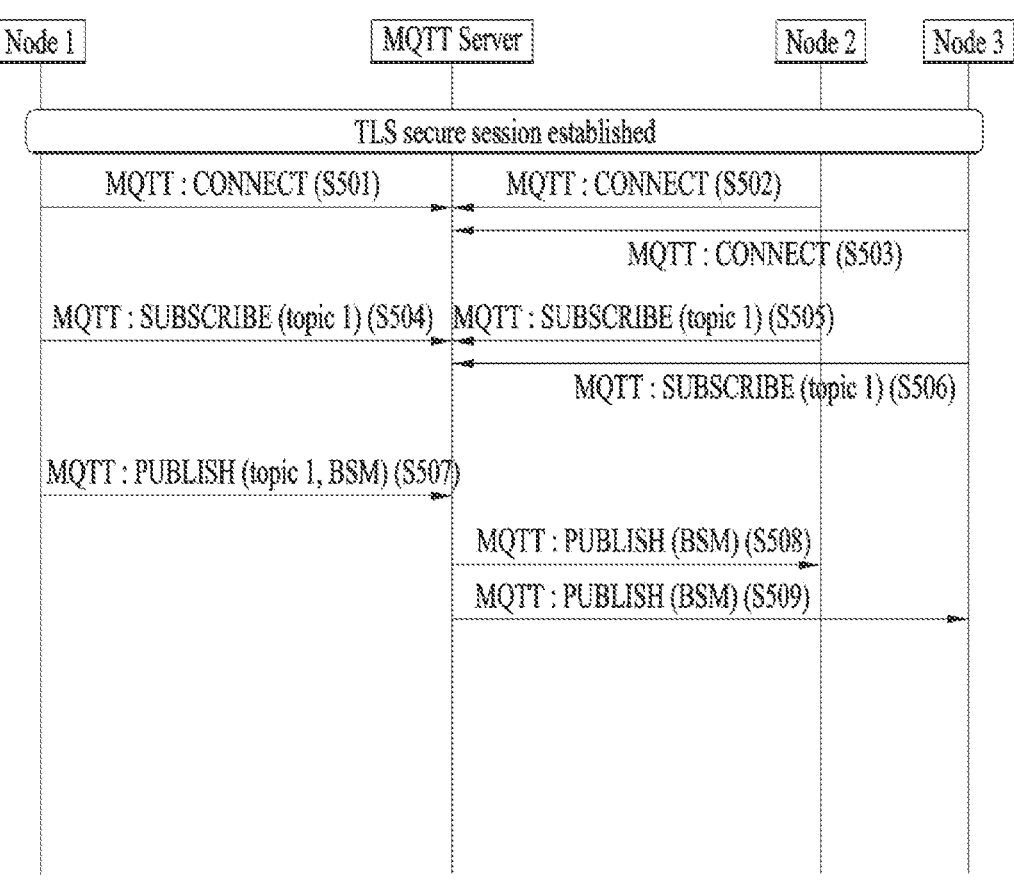
FIG. 5 is a flowchart showing an example of performing geocast using MQTT in Soft V2X according to an embodiment of the present disclosure.

FIG. 5 is a flowchart showing an example of performing geocast using MQTT in SoftV2X. In Legacy V2X, devices in the same region can naturally receive messages (such as BSM, etc.) through a broadcast channel. However, since cellular networks use unicast communication, SoftV2X uses MQTT to perform unicast transmission to all devices in the same region, resulting in broadcast-like effects.

For MQTT communication, a secure session is first set up between all nodes and a server using TLS. Each node can first perform a CONNECT process and then perform a SUBSCRIBE process on a specific topic (S501 to S503 of FIG. 5). In this case, a topic is selected differently depending on a region. A map can be divided by a tile, and the same topic value can be given to each tile. Therefore, each of the nodes performs SUBSCRIBE by selecting a topic according to a tile in which the corresponding node is located. For example, in FIG. 5, Nodes 1, 2, and 3 were all present in the same tile (region and subscribed to the same topic 1 (S504 to 506 in FIG. 5).

When the Node1 transmits PUBLISH (BSM) to the MQTT server (S507), the server delivers the PUBLISH (BSM) in a unicast manner to all nodes having subscribed to the topic 1 (S508, S509). Each of the Node 2 and the Node 3 performs Classification and Threat Assessment based on the received BSM message. If detecting danger, the corresponding node informs smartphone users (e.g., pedestrian and driver) of the detection of the danger. A car or vehicle transmits BSM and a pedestrian transmits PSM, and these messages basically contain information (e.g., ID, location, speed, acceleration, direction, etc.) necessary for danger detection.

For a large-scale service, Soft V2X servers can be disposed in a manner of dividing regions. A UE can access a server in charge of a region where the UE is located and receive a Soft V2X service. When moving to a location where another server is in charge, the UE can access the server in charge of the region. For such a large-scale service, the servers can include a server that performs other functions as well as a message exchange server (e.g., a Soft V2X server, an MQTT server, etc.). There can be a lookup server that manages information of the message exchange servers deployed separately, a user server that manages user's information, a security server in charge of security functions, a monitoring server that manages a server operation, a DBMS storing user information, etc. In particular, the lookup server is a server that manages information of the message exchange server and manages important information for performing a distributed server function. The lookup server manages information on the management region of the locally distributed message exchange server, a status of the server, information such as IP address and port for UE's access, and the like and provides such information when necessary.

A message exchange server related to V2X message transmission and reception according to one embodiment can obtain information on an adjacent message exchange server from a lookup server and receive a message published by a User Equipment (UE). The message exchange server can determine whether a topic included in the message is included in a topic list of the message exchange server.

If the topic included in the message is not included in the topic list of the message exchange server, the message exchange server can transmit a handover message to the UE. Here, the handover message can include information on a message exchange server corresponding to the topic included in the message. Accordingly, the UE having received the handover message can handover to the corresponding message exchange server based on the information of the message exchange server corresponding to the topic included in the message.

In addition, irrespective of whether the topic included in the message is included in the topic list of the message exchange server, the message exchange server can deliver the message to UEs who subscribe to the topic. Topics included in the topic list can be included in a management area of the message exchange server. The information of the adjacent message exchange server can be a topic list of the adjacent exchange server. The topic can be calculated by the UE based on a current location of the UE.

In other words, in the locally deployed distributed server structure, a server identifies a location of a UE using a topic of a UE's publish message and moves or transfers the UE to another server if it deviates from a topic list including a management area of the server. A message exchange server receives and manages information including its own management area and management areas of servers adjacent to the message exchange server from a lookup server in advance (at initialization). The UE calculates a topic based on its location and publishes it to the server, and the server checks whether it is a topic of its own management area by using the topic of the received message. If it is not the topic of its own management area, the server generates a handover message and delivers it to the UE in order to move or transfer the UE to a server that manages the corresponding topic. The UE connects to the corresponding server using the information of the server included in the handover message, exchanges messages, and terminates the connection with the previously connected server.

Figure 6:
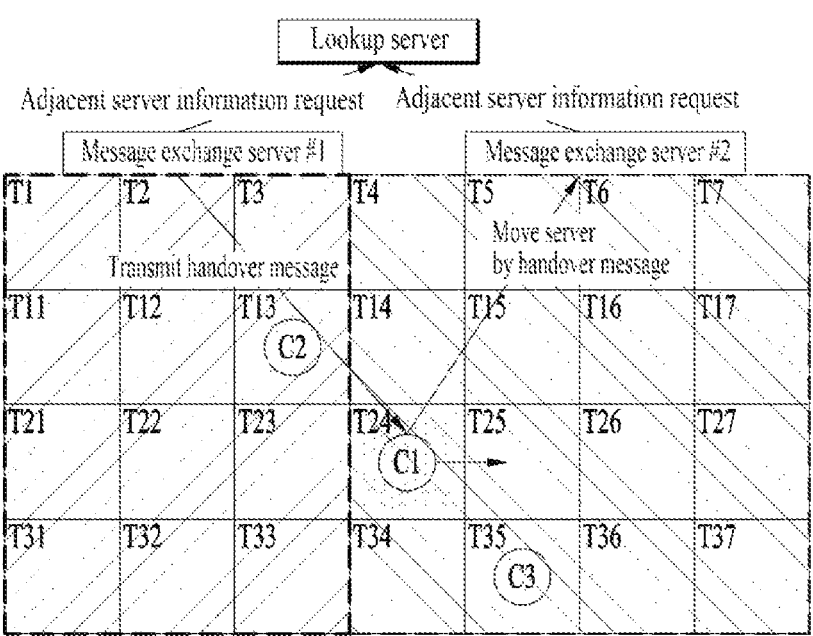
Figure 7:
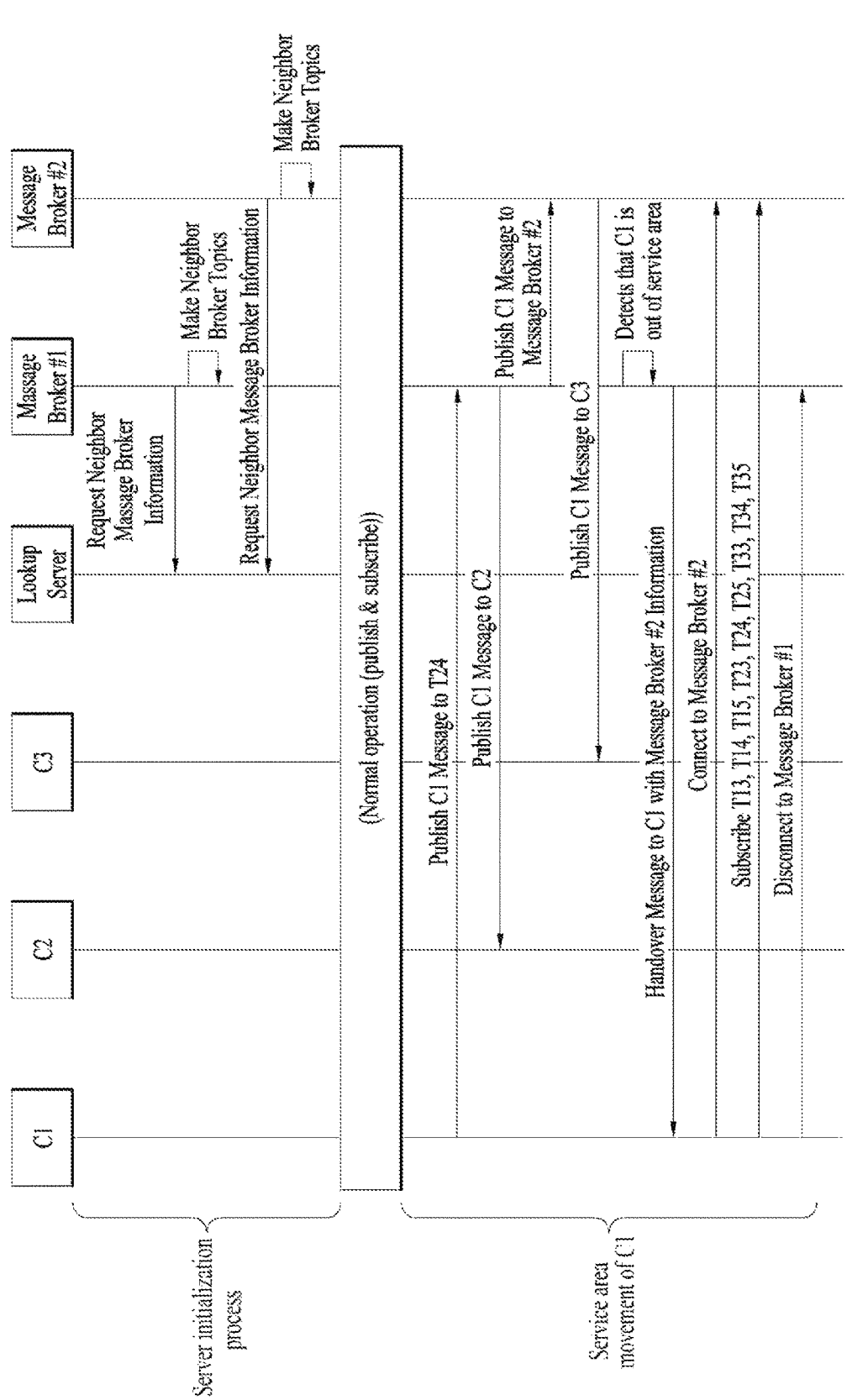

In relation to the above description, FIG. 6 and FIG. 7 show an example related to a server-to-server movement method of a UE in a server-led manner when the UE moves out of a management area of a currently connected message exchange server to another management area of another adjacent server. Hereinafter, an operation of each subject will be described with reference to FIG. 6 and FIG. 7.

In a server initialization process, message exchange servers #1 and #2 can obtain information of a message exchange server managing an area adjacent to their management areas from a lookup server. Each of the message exchange servers can generate and manage a topic list of its own and a topic list of the message exchange server managing the area adjacent to its own topic list. Thereafter, a normal message exchange process can be performed (UE's movement and Publish & Subscribe).

As shown in FIG. 7, C1 performs Publish while outside the management area of the message exchange server #1, and the message exchange server #1 can detect it using a topic in the Publish message of the C1.

The Publish message of the C1 can be processed (meanwhile, another UE connected to the message exchange server #1 can be subscribing to the corresponding topic). A handover message (including information on the message exchange server #2 managing the corresponding topic) can be delivered to the C1. The C1 can connect to the message exchange server #2. A normal message exchange process (Publish & Subscribe) can be performed. In addition, the C1 can terminate the connection with the message exchange server #1.

The above-described message delivery method for handover can include a method of using an existing MQTT Publish Control Packet (e.g., publishing in a manner of including message exchange server information in a specific topic, and extracting message exchange server information from this message and using it by a client) and a method of expanding MQTT Protocol.

Regarding the latter, it can be used exclusively for Soft V2X using an existing Reserved Control Packet Type (0). In addition, Command field can be added to Variable Header to use a message for various purposes, and Property and Payload can be applied separately depending on Command.

Specifically, the message can be an MQTT Control Packet set to 'Reserved Control Packet Type=0'. In addition, the MQTT Control Packet can include Soft V2X Specific Command field in Variable Header. FIG. 8 (a) illustrates an example of MQTT Control Packet corresponding to such a Soft V2X Specific Control Packet.

In addition, MQTT Protocol for handover message delivery can be extended, and Handover Command assignment (e.g., Handover Command=1) can be performed. Information of a message exchange server to which a client should move can be added, and message exchange server information can be added to Payload. Specifically, the handover message can include HANDOVER Command field set to 1 in the Variable Header, and FIG. 8 (b) illustrates a Soft V2X specific control packet for the Handover command.

Figure 9:
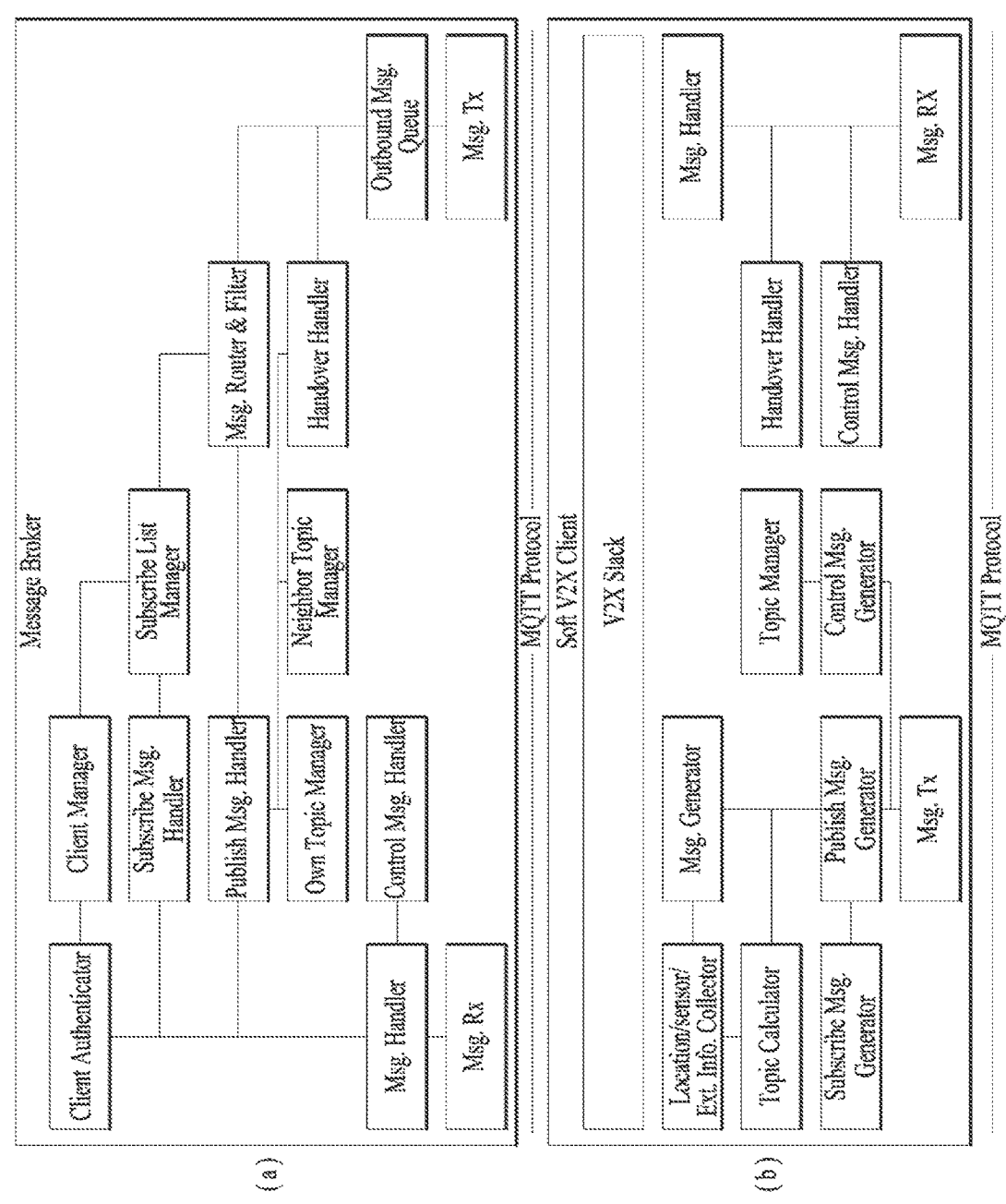

FIG. 9 illustrates an example of a message exchange server (FIG. 9 (a)) and a UE (FIG. 9 (b)) related to the present disclosure. The following Table 3 and Table 4 describe the main components of the message exchange server (FIG. 9 (a)) and the UE (FIG. 9 (b)), respectively.

TABLE 3

Publish Msg. Handler: Processes a Publish messages received from a client. The server can check whether Publish Topic is Topic within a management area of its own or Topic of an adjacent server, and if necessary, send a handover message to the client. The received Publish message is forwarded to Msg. Router & Filter to forward the message to the client who should receive it.
Msg. Router & Filter: Checks Subscribe List to select a client to receive a Publish message, filters a case that message delivery is not required depending on a client type, and forwards it to Outbound Msg. Queue.
Own Topic Manager: A module that manages Topic List of a region managed by the server itself.
Neighbor Topic Manager: A module that manages Topic Lists of management areas of adjacent servers.
Handover Handler: A module that generates and delivers a Handover message to a client.
Outbound Msg. Queue: A queue in which a message having a receiving target determined is temporarily stored.
Msg. TX: A module that transmits a message.
Subscribe Msg. Handler: A module that processes Subscribe message. This module creates Subscribe List in response to client's request.
Subscribe List Manager: A module that manages Subscribe List. The Subscribe List can be used to find a client to deliver Publish message thereto.
Client Authenticator: A module responsible for client authentication. Only authenticated client can use Soft V2X service.
Client Manager: A module that manages authenticated clients.

TABLE 4

V2X Stack: Responsible for V2X-related services.
Msg. Generator: Generates Soft V2X messages using location information, sensor information, and other information.
Location/Sensor/Ext. Info. Collector: Location information, sensor information, and other information are collected and provided for the generation of Soft V2X messages.
Topic Calculator: Calculates Topic using location information. Calculates Topic in which it is located and adjacent Topics to receive the message.
Subscribe Msg. Generator: Generates a Subscribe message. A message can be generated to subscribe to a Topic of its own location and an adjacent Topic of the corresponding Topic, a Topic in its own direction of progress, etc.
Publish Msg. Generator: Generates a Publish message. Generates a message using a Soft V2X message and its own Topic information.
Control Msg. Generator: A module that generates a control message. The control message can be used for access, authentication, and the like of the client.
Topic Manager: A module that manages Topic of a message exchange server to which it connects. It is a module necessary to perform handover led by UE.
Msg. TX: Sends a message to a message exchange server.

TABLE 4-continued

Msg. RX: A module that receives a message from a message
exchange server
Msg. Handler: Processes a Soft V2X message received from a server
and delivers the messages to V2X Stack.
Control Msg. Handler: A module that processes a control message
received from a server.
Handover Handler: Processes a Handover message received from a
server, connects to the server to handover thereto, and terminates
a connection with an existing connected server.

On the other hand, the local deployment of the message
exchange servers can use a method of dividing a boundary
between the message exchange servers to fit a topic as
shown in FIG. 10 (a). If a moving route crosses the boundary
between the servers depending on a road situation or a local
situation, if a UE shakes, or if location accuracy is poor, the
UE I can move back and forth between the servers fre-
quently. In addition, if the UE moves frequently between the
servers, the frequency of control messages for UE connec-
tion, UE access, authentication and the like can increase in
addition to messages for a Soft V2X service, and thus the UE
frequently changes the connection between the server A and
the server B.

Considering this point, in the present disclosure, the
message exchange server and the adjacent message
exchange server can share one or more topics at the bound-
ary between their own management areas. That is, as illus-
trated in FIG. 10 (b), a method of sharing a boundary
between adjacent message exchange servers can be used.
Since the topic shared between servers serves as a buffer, a
UE's movement between servers in a boundary area of the
message exchange server can be minimized. Depending on
road conditions or local situations, the UE's movement
between servers does not occur frequently even when a
moving route crosses the boundary between servers, when
the UE is shaken, or when the location accuracy is poor. In
this method, it is advantageous in that there is no connection
change in the middle while the UE changes the connection
from the server A to the server B. In other words, handoff of
a UE being transferred from one server to an adjacent server
can be delayed, until it is deem more certain, in order to
avoid unnecessary handoff and transfer control messages.

In relation to the above-described embodiment, a message
exchange server related to V2X message transmission and
reception can include at least one processor and at least one
computer memory operably connected to the at least one
processor and storing instructions to enable the at least one
processor to perform operations when executed, the opera-
tions including obtaining information of an adjacent mes-
sage exchange server from a lookup server by the message
exchange server, receiving by the message exchange server
a message published by a User Equipment (UE), and deter-
mining by the message exchange server whether a topic
included in the message is included in a topic list of the
message exchange server, in which based on the topic
included in the message not being included in the topic list
of the message exchange server, the message exchange
server can transmit a handover message to the UE.

Moreover, in a processor enabling operations to be per-
formed for a message exchange server, the operations can
include obtaining information of an adjacent message
exchange server from a lookup server by the message
exchange server, receiving by the message exchange server
a message published by a User Equipment (UE), and deter-
mining by the message exchange server whether a topic
included in the message is included in a topic list of the message exchange server, in which based on the topic
included in the message not being included in the topic list
of the message exchange server, the message exchange
server can transmit a handover message to the UE.

In a non-volatile computer-readable storage medium stor-
ing at least one computer program including instructions
enabling at least one processor to perform operations for a
message exchange server when executed, the operations can
include obtaining information of an adjacent message
exchange server from a lookup server by the message
exchange server, receiving by the message exchange server
a message published by a User Equipment (UE), and deter-
mining by the message exchange server whether or not a
topic included in the message is included in a topic list of the
message exchange server, in which based on the topic
included in the message not being included in the topic list
of the message exchange server, the message exchange
server can transmit a handover message to the UE.

As another example, A UE-led scheme is as follows. A UE
obtains information of a message exchange server to connect
to at its location through a lookup server, and generates and
manages a topic list included in a management area of the
obtained message exchange server. The UE calculates a
topic based on its location, and when it deviates from a topic
of the currently connected message exchange server, the UE
obtains information of the message exchange server man-
aging the current location from the lookup server again. The
UE generates and manages a topic list of the newly obtained
message exchange server. The UE connects to the new
message exchange server to transmit and receive a message,
and terminates the connection with the previously connected
server. In other words, in a locally deployed distributed
server structure, if the topic calculated based on the current
location of the UE is outside the topic list including the
management area of the server to which the UE is currently
connected, the UE obtains information of a server including
a topic of its (current) location as a management area and
then moves to the corresponding server.

FIG. 11 illustrates an example of a method for verifying
movement between message exchange servers by a UE
when the above-described embodiment is applied. In FIG.
11, as an example of a UE's movement between message
servers, it is assumed that a handover occurs when a UE C
moves from a position 03011 to a position 03100.

When the UE C is located at the position 03011, it is
connected to a message exchange server #1 and a user
interface UI of the UE is shown in FIG. 11 (b1). In the
drawing, CurSrvIP (an IP of the currently connected server)
is the IP (3.37.36.224) of the message exchange server #1,
and handover H/O Status is 'Complete' because it is not a
handover situation.

When the UE C moves to the position 03100, it is
connected to a message exchange server #2 to hand over
thereto while being connected to the message exchange
server #1. A UI of the UE is shown in FIG. 11 (b2). In FIG.
11 (b2), CurSrvIP (an IP of the currently connected server)
is the IP (3.37.36.224) of the message exchange server #1,
and HOSrvIP (an IP of the server to hand over thereto) is an
IP (3.35.41.44) of the message exchange server #2. Also, the
handover H/O Status is 'Start' because it is a handover
situation.

When The UE "C" requests to subscribe to a subscription
area of the message exchange server #2 at the position 03100
and it is in a situation to publish normally, the handover is
completed. In this situation, a user interface UI of the UE is
shown in FIG. 11 (b3). In FIG. 11 (b3), CurSrvIP (the IP of
the currently connected server) is the IP (3.35.41.44) of the message exchange server #2, and since the handover is completed, the handover H/O Status is 'Complete'.

In this way, when the present disclosure is applied, a handover occurs between message exchange servers due to the movement of a UE, so this can be grasped by the UE through an IP of a server currently connected and an IP of a server to hand over thereto. In addition, as shown, even if an IP change of a server is not identified on a user interface UI, this can be confirmed through the IP change of the server in internal instruction processing.

FIG. 12 illustrates an example of a user interface UI related to the above embodiment. Specifically, in FIG. 12 (*a*), as indication of a neighbor UE adjacent to a UE of its own, the UE (e.g., vehicle) of its own is displayed on a map and other UEs (e.g., vehicle, pedestrian, kickboard, etc.) adjacent to the UE of its own are displayed as icons.

In FIG. 12 (*b*), as a collision notification, a collision danger notification is displayed when a collision between a UE of its own and a neighbor UE is expected. The notification method includes a screen display, sound, vibration, and the like.

FIG. 12(*c*) shows a subscription area setting. A range of a topic to receive neighbor messages can be set. FIG. 12 (*c*) shows an example of subscribing to 9 topics or 25 topics including its own location.

FIG. 12 (*d*) shows a UI for setting a Geocast Zoom Level as a Geocast Zoom Level setting. Depending on a situation, a size of a topic can be changed by changing a Zoom Level as shown in the example of FIG. 21 (*e*), in which the Zoom Level is set to 19.

Examples of Communication Systems Applicable to the Present Disclosure

The various descriptions, functions, procedures, proposals, methods, and/or operational flowcharts of the present disclosure described in this document can be applied to, without being limited to, a variety of fields requiring wireless communication/connection (e.g., 5G) between devices.

Hereinafter, a description will be given in more detail with reference to the drawings. In the following drawings/description, the same reference symbols can denote the same or corresponding hardware blocks, software blocks, or functional blocks unless described otherwise.

Figure 13:
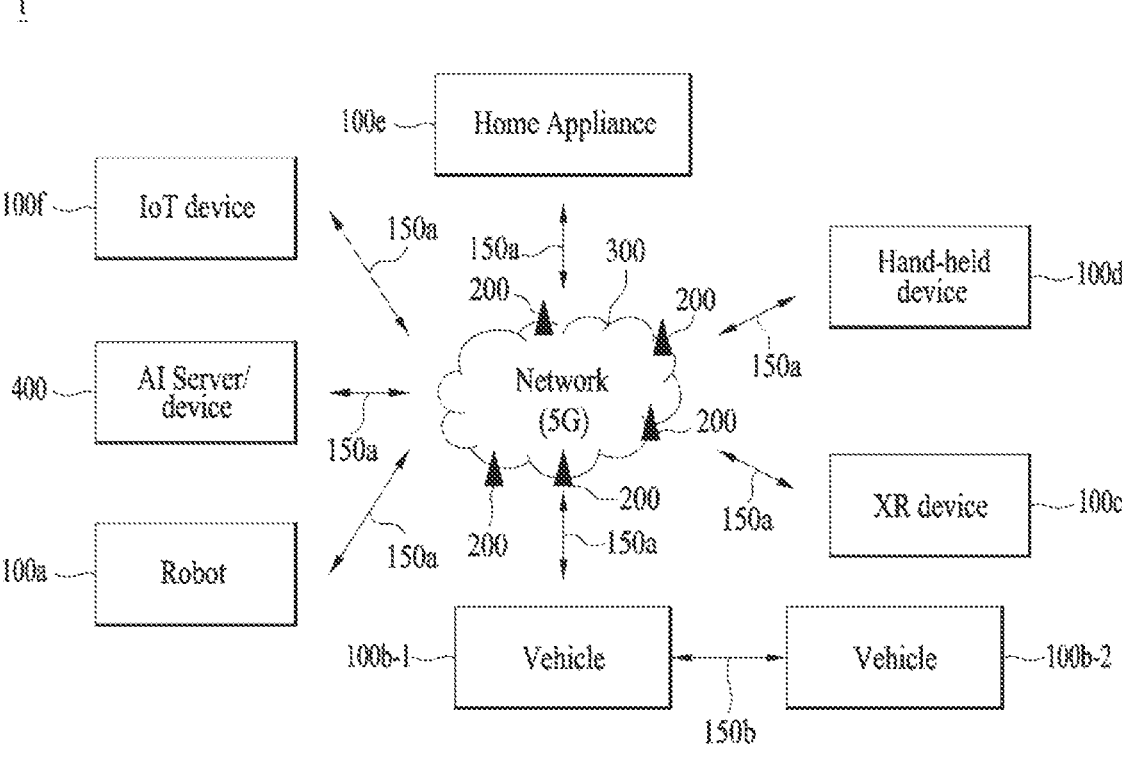

FIG. 13 illustrates a communication system 1 applied to the present disclosure.

Referring to FIG. 13, a communication system 1 applied to the present disclosure includes wireless devices, BSs, and a network. Herein, the wireless devices represent devices performing communication using RAT (e.g., 5G NR or LTE) and can be referred to as communication/radio/5G devices. The wireless devices can include, without being limited to, a robot 100*a*, vehicles 100*b*-1 and 100*b*-2, an extended reality (XR) device 100*c*, a hand-held device 100*d*, a home appliance 100*e*, an Internet of things (IoT) device 100*f*, and an artificial intelligence (AI) device/server 400. For example, the vehicles can include a vehicle having a wireless communication function, an autonomous driving vehicle, and a vehicle capable of performing communication between vehicles. Herein, the vehicles can include an unmanned aerial vehicle (UAV) (e.g., a drone). The XR device can include an augmented reality (AR)/virtual reality (VR)/mixed reality (MR) device and can be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device can include a smartphone, a smartpad, a wearable device (e.g., a smartwatch or a smartglasses), and a computer (e.g., a notebook). The home appliance can include a TV, a refrigerator, and a washing machine. The IoT device can include a sensor and a smartmeter. For example, the BSs and the network can be implemented as wireless devices and a specific wireless device 200*a* can operate as a BS/network node with respect to other wireless devices.

The wireless devices 100*a* to 100*f* can be connected to the network 300 via the BSs 200. An AI technology can be applied to the wireless devices 100*a* to 100*f* and the wireless devices 100*a* to 100*f* can be connected to the AI server 400 via the network 300. The network 300 can be configured using a 3G network, a 4G (e.g., LTE) network, or a 5G (e.g., NR) network. Although the wireless devices 100*a* to 100*f* can communicate with each other through the BSs 200/network 300, the wireless devices 100*a* to 100*f* can perform direct communication (e.g., sidelink communication) with each other without passing through the BSs/network. For example, the vehicles 100*b*-1 and 100*b*-2 can perform direct communication (e.g. V2V/V2X communication). The IoT device (e.g., a sensor) can perform direct communication with other IoT devices (e.g., sensors) or other wireless devices 100*a* to 100*f*.

Wireless communication/connections 150*a*, 150*b*, or 150*c* can be established between the wireless devices 100*a* to 100*f*/BS 200, or BS 200/BS 200. Herein, the wireless communication/connections can be established through various RATs (e.g., 5G NR) such as UL/DL communication 150*a*, sidelink communication 150*b* (or, D2D communication), or inter BS communication (e.g., relay, integrated access backhaul (IAB)). The wireless devices and the BSs/the wireless devices can transmit/receive radio signals to/from each other through the wireless communication/connections 150*a* and 150*b*. For example, the wireless communication/connections 150*a* and 150*b* can transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, can be performed based on the various proposals of the present disclosure.

Examples of Wireless Devices Applicable to the Present Disclosure

Figure 14:
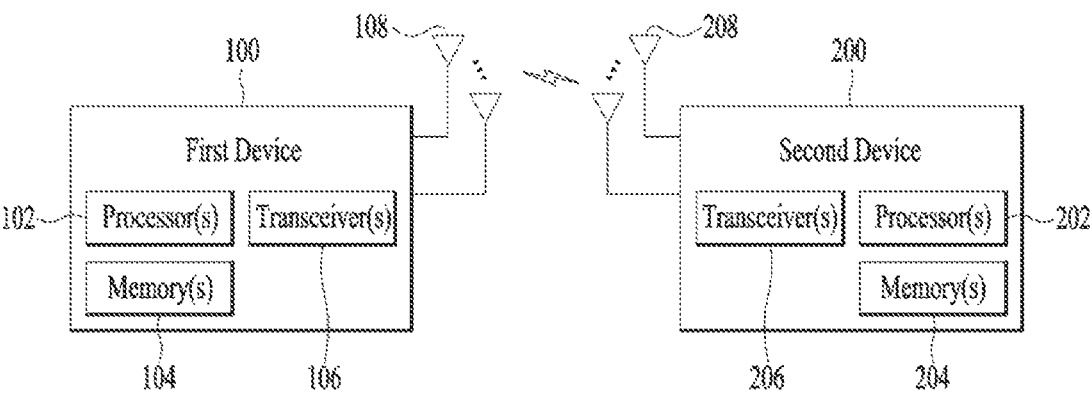

FIG. 14 illustrates wireless devices according to embodiments of the present disclosure.

Referring to FIG. 14, a first wireless device 100 and a second wireless device 200 can transmit radio signals through a variety of RATs (e.g., LTE and NR). Herein, the first wireless device 100 and the second wireless device 200 can correspond to the wireless device 100*x* and the BS 200 and/or two of the wireless devices 100*a*-100*f* of FIG. 13.

The first wireless device 100 can include one or more processors 102 and one or more memories 104 and additionally further include one or more transceivers 106 and/or one or more antennas 108. The processor(s) 102 can control the memory(s) 104 and/or the transceiver(s) 106 and can be configured to implement the descriptions, functions, procedures, proposals, methods, and/or operational flowcharts disclosed in this document. For example, the processor(s) 102 can process information within the memory(s) 104 to generate first information/signals and then transmit radio signals including the first information/signals through the transceiver(s) 106. The processor(s) 102 can receive radio signals including second information/signals through the transceiver 106 and then store information obtained by processing the second information/signals in the memory(s)

104. The memory(s) 104 can be connected to the processor(s) 102 and can store a variety of information related to operations of the processor(s) 102. For example, the memory(s) 104 can store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 can be a part of a communication modem/circuit/chip designed to implement RAT (e.g., LTE or NR). The transceiver(s) 106 can be connected to the processor(s) 102 and transmit and/or receive radio signals through one or more antennas 108. Each of the transceiver(s) 106 can include a transmitter and/or a receiver. The transceiver(s) 106 can be interchangeably used with Radio Frequency (RF) unit(s). In the present disclosure, the wireless device can represent a communication modem/circuit/chip.

The second wireless device 200 can include one or more processors 202 and one or more memories 204 and additionally further include one or more transceivers 206 and/or one or more antennas 208. The processor(s) 202 can control the memory(s) 204 and/or the transceiver(s) 206 and can be configured to implement the descriptions, functions, procedures, proposals, methods, and/or operational flowcharts disclosed in this document. For example, the processor(s) 202 can process information within the memory(s) 204 to generate third information/signals and then transmit radio signals including the third information/signals through the transceiver(s) 206. The processor(s) 202 can receive radio signals including fourth information/signals through the transceiver(s) 106 and then store information obtained by processing the fourth information/signals in the memory(s) 204. The memory(s) 204 can be connected to the processor(s) 202 and can store a variety of information related to operations of the processor(s) 202. For example, the memory(s) 204 can store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 can be a part of a communication modem/circuit/chip designed to implement RAT (e.g., LTE or NR). The transceiver(s) 206 can be connected to the processor(s) 202 and transmit and/or receive radio signals through one or more antennas 208. Each of the transceiver(s) 206 can include a transmitter and/or a receiver. The transceiver(s) 206 can be interchangeably used with RF unit(s). In the present disclosure, the wireless device can represent a communication modem/circuit/chip.

Hereinafter, hardware elements of the wireless devices 100 and 200 will be described more specifically. One or more protocol layers can be implemented by, without being limited to, one or more processors 102 and 202. For example, the one or more processors 102 and 202 can implement one or more layers (e.g., functional layers such as PHY, MAC, RLC, PDCP, RRC, and SDAP). The one or more processors 102 and 202 can generate one or more Protocol Data Units (PDUs) and/or one or more service data unit (SDUs) according to the descriptions, functions, procedures, proposals, methods, and/or operational flowcharts disclosed in this document. The one or more processors 102 and 202 can generate messages, control information, data, or information according to the descriptions, functions, procedures, proposals, methods, and/or operational flowcharts disclosed in this document. The one or more processors 102 and 202 can generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 can receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 can be referred to as controllers, microcontrollers, microprocessors, or microcomputers. The one or more processors 102 and 202 can be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) can be included in the one or more processors 102 and 202. The descriptions, functions, procedures, proposals, methods, and/or operational flowcharts disclosed in this document can be implemented using firmware or software and the firmware or software can be configured to include the modules, procedures, or functions. Firmware or software configured to perform the descriptions, functions, procedures, proposals, methods, and/or operational flowcharts disclosed in this document can be included in the one or more processors 102 and 202 or stored in the one or more memories 104 and 204 to be driven by the one or more processors 102 and 202. The descriptions, functions, procedures, proposals, methods, and/or operational flowcharts disclosed in this document can be implemented using firmware or software in the form of code, commands, and/or a set of commands.

The one or more memories 104 and 204 can be connected to the one or more processors 102 and 202 and store various types of data, signals, messages, information, programs, code, instructions, and/or commands. The one or more memories 104 and 204 can be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 can be located at the interior and/or exterior of the one or more processors 102 and 202. The one or more memories 104 and 204 can be connected to the one or more processors 102 and 202 through various technologies such as wired or wireless connection.

The one or more transceivers 106 and 206 can transmit user data, control information, and/or radio signals/channels, mentioned in the methods and/or operational flowcharts of this document, to one or more other devices. The one or more transceivers 106 and 206 can receive user data, control information, and/or radio signals/channels, mentioned in the descriptions, functions, procedures, proposals, methods, and/or operational flowcharts disclosed in this document, from one or more other devices. For example, the one or more transceivers 106 and 206 can be connected to the one or more processors 102 and 202 and transmit and receive radio signals. For example, the one or more processors 102 and 202 can perform control so that the one or more transceivers 106 and 206 can transmit user data, control information, or radio signals to one or more other devices.

The one or more processors 102 and 202 can perform control so that the one or more transceivers 106 and 206 can receive user data, control information, or radio signals from one or more other devices. The one or more transceivers 106 and 206 can be connected to the one or more antennas 108 and 208 and the one or more transceivers 106 and 206 can be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas can be a plurality of physical antennas or a plurality of logical antennas (e.g., antenna ports). The one or more transceivers 106 and 206 can convert received radio signals/channels etc. from RF band signals into baseband signals in order to process received user data, control information, radio signals/channels, etc. using the one or more processors 102 and 202. The one or more transceivers 106 and 206 can convert the user data, control information, radio signals/channels, etc. processed using the one or more processors 102 and 202 from the base band signals into the RF band signals. To this end, the one or more transceivers 106 and 206 can include (analog) oscillators and/or filters.

Figure 15:
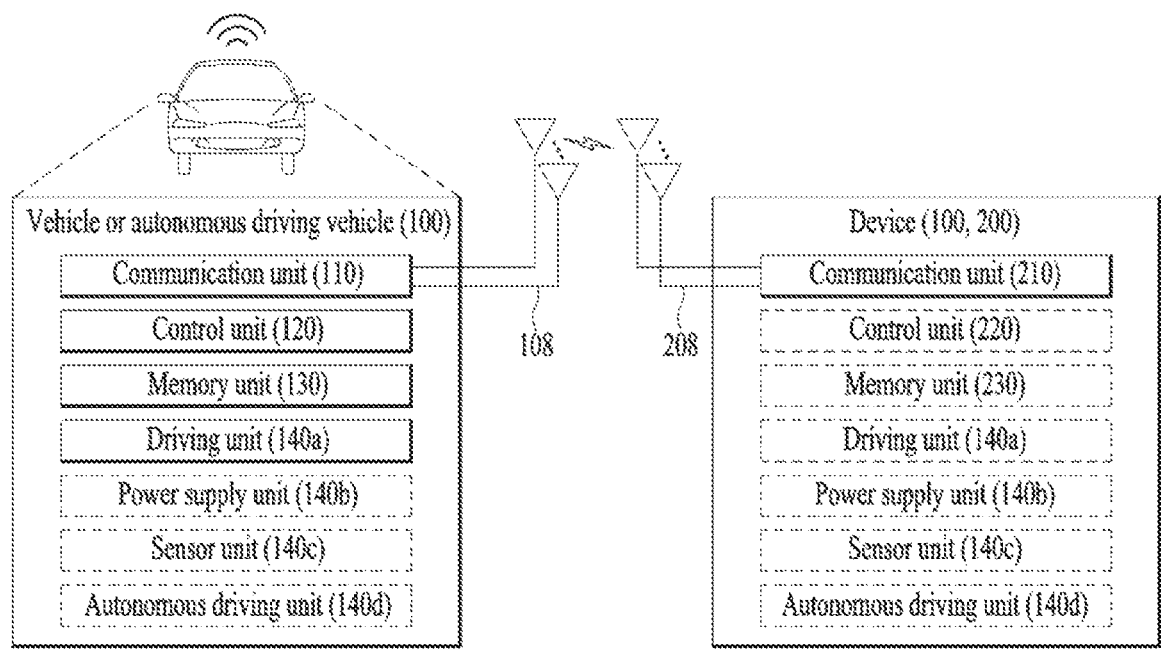

Examples of a Vehicle or an Autonomous Driving Vehicle Applicable to the Present Disclosure FIG. 15 illustrates a vehicle or an autonomous driving vehicle according to an embodiment of the present disclosure. The vehicle or autonomous driving vehicle can be implemented by a mobile robot, a car, a train, a manned/unmanned aerial vehicle (AV), a ship, etc.

Referring to FIG. 15, a vehicle or autonomous driving vehicle 100 can include an antenna unit 108, a communication unit 110 (e.g., transceiver), a control unit 120 (e.g., controller or processor), a driving unit 140a, a power supply unit 140b, a sensor unit 140c, and an autonomous driving unit 140d. The antenna unit 108 can be configured as a part of the communication unit 110.

The communication unit 110 can transmit and receive signals (e.g., data and control signals) to and from external devices such as other vehicles, BSs (e.g., gNBs and road side unit devices), and servers. The control unit 120 can perform various operations by controlling elements of the vehicle or the autonomous driving vehicle 100. The control unit 120 can include an ECU. The driving unit 140a can cause the vehicle or the autonomous driving vehicle 100 to drive on a road. The driving unit 140a can include an engine, a motor, a powertrain, a wheel, a brake, a steering device, etc. The power supply unit 140b can supply power to the vehicle or the autonomous driving vehicle 100 and include a wired/wireless charging circuit, a battery, etc. The sensor unit 140c can acquire a vehicle state, ambient environment information, user information, etc. The sensor unit 140c can include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d can implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 can receive map data, traffic information data, etc. from an external server. The autonomous driving unit 140d can generate an autonomous driving path and a driving plan from the obtained data. The control unit 120 can control the driving unit 140a such that the vehicle or the autonomous driving vehicle 100 can move along the autonomous driving path according to the driving plan (e.g., speed/direction control). In the middle of autonomous driving, the communication unit 110 can aperiodically/periodically acquire recent traffic information data from the external server and acquire surrounding traffic information data from neighboring vehicles. In the middle of autonomous driving, the sensor unit 140c can obtain a vehicle state and/or surrounding environment information. The autonomous driving unit 140d can update the autonomous driving path and the driving plan based on the newly obtained data/information. The communication unit 110 can transfer information about a vehicle position, the autonomous driving path, and/or the driving plan to the external server. The external server can predict traffic information data using AI technology, etc., based on the information collected from vehicles or autonomous driving vehicles and provide the predicted traffic information data to the vehicles or the autonomous driving vehicles.

Examples of a Vehicle and AR/VR Applicable to the Present Disclosure

FIG. 16 illustrates a vehicle applied to the present disclosure. The vehicle can be implemented as a transport means, an aerial vehicle, a ship, etc.

Referring to FIG. 16, a vehicle 100 can include a communication unit 110, a control unit 120, a memory unit 130, an I/O unit 140a, and a positioning unit 140b.

The communication unit 110 can transmit and receive signals (e.g., data and control signals) to and from external devices such as other vehicles or BSs. The control unit 120 can perform various operations by controlling constituent elements of the vehicle 100. The memory unit 130 can store data/parameters/programs/code/commands for supporting various functions of the vehicle 100. The I/O unit 140a can output an AR/VR object based on information within the memory unit 130. The I/O unit 140a can include an HUD. The positioning unit 140b can acquire information about the position of the vehicle 100. The position information can include information about an absolute position of the vehicle 100, information about the position of the vehicle 100 within a traveling lane, acceleration information, and information about the position of the vehicle 100 from a neighboring vehicle. The positioning unit 140b can include a GPS and various sensors.

As an example, the communication unit 110 of the vehicle 100 can receive map information and traffic information from an external server and store the received information in the memory unit 130. The positioning unit 140b can obtain the vehicle position information through the GPS and various sensors and store the obtained information in the memory unit 130. The control unit 120 can generate a virtual object based on the map information, traffic information, and vehicle position information and the I/O unit 140a can display the generated virtual object in a window in the vehicle (1410 and 1420). The control unit 120 can determine whether the vehicle 100 normally drives within a traveling lane, based on the vehicle position information. If the vehicle 100 abnormally exits from the traveling lane, the control unit 120 can display a warning on the window in the vehicle through the I/O unit 140a. In addition, the control unit 120 can broadcast a warning message regarding driving abnormality to neighboring vehicles through the communication unit 110. According to situation, the control unit 120 can transmit the vehicle position information and the information about driving/vehicle abnormality to related organizations.

INDUSTRIAL APPLICABILITY

The above-described embodiments of the present disclosure are applicable to various mobile communication systems.

What is claimed is:

1. A method of operating a message exchange server related to vehicle-to-everything (V2X) message transmission and reception in a wireless communication system, the method comprising:

obtaining, by the message exchange server, a first topic list of an adjacent message exchange server from a lookup server;

receiving, by the message exchange server, a message published by a user equipment (UE); and in response to determining, by the message exchange server, that a topic included in the message published by the UE is not included in a second topic list of the message exchange server and the topic is included in the first topic list, transmitting, by the message exchange server, a handover message to the UE, wherein the message exchange server forwards the message published by the UE to other UEs subscribing to the topic regardless of whether or not the topic included in the message published by the UE is included in the second topic list of the message exchange server.

2. The method of claim 1, wherein the handover message includes information of the adjacent message exchange server corresponding to the topic included in the message published by the UE.

3. The method of claim 1, wherein topics included in the second topic list of the message exchange server are included in a management area of the message exchange server.

4. The method of claim 1, wherein the message exchange server and the adjacent message exchange server share one or more topics for a boundary area between a first management area of the message exchange server and a second management area of the adjacent message exchange server.

5. The method of claim 4, wherein the message exchange server delays transmission of the handover message to the UE until the UE is located within the boundary area or exits the boundary area.

6. The method of claim 1, wherein the topic is calculated by the UE based on a current location of the UE.

7. The method of claim 1, wherein the message is a Message Queuing Telemetry Transport (MQTT) Control Packet set as Reserved Control Packet Type=0.

8. The method of claim 7, wherein the MQTT Control Packet includes a Soft V2X specific command in a Variable Header.

9. The method of claim 1, wherein the handover message includes a HANDOVER Command field set to 1 in a Variable Header.

10. The method of claim 1, wherein the UE includes at least one of a vehicle, a mobile terminal, a smart phone, a laptop, a home appliance, an On Board Unit (OBU) or a drone.

11. A message exchange server related to vehicle-to-everything (V2X) message transmission and reception in a wireless communication system, the message exchange server comprising:

at least one processor; and at least one computer memory operably connected to the at least one processor and storing instructions to enable the at least one processor to perform operations when executed, the operations comprising:

obtaining a first topic list of an adjacent message exchange server from a lookup server by the message exchange server;

receiving by the message exchange server a message published by a user equipment (UE); and in response to determining that a topic included in the message published by the UE is not included in a second topic list of the message exchange server and the topic is included in the first topic list, transmitting a handover message to the UE, wherein the message exchange server forwards the message published by the UE to other UEs subscribing to the topic regardless of whether or not the topic included in the message published by the UE is included in the second topic list of the message exchange server.

12. The message exchange server of claim 11, wherein the message exchange server and the adjacent message exchange server share one or more topics for a boundary area between a first management area of the message exchange server and a second management area of the adjacent message exchange server.

13. The message exchange server of claim 12, the operations further comprising:

delaying transmission of the handover message to the UE until the UE is located within the boundary area or exits the boundary area.

14. A user equipment (UE) related to vehicle-to-everything (V2X) message transmission and reception in a wireless communication system, the UE comprising:

a communication interface configured to transmit and receive messages with one or more message exchange servers;

a display configured to display an image; and a controller configured to:

publish a message including a topic to a message exchange server, receive a handover message from the message exchange server when the topic including in the message published by the UE is not included in a second topic list of the message exchange server and the topic is included in a first topic list of an adjacent message exchange server, and display an Internet Protocol (IP) address of an adjacent message exchange server to handle a handover procedure for the UE based on the handover message, wherein the message is forwarded by the message exchange server to other UEs subscribing to the topic regardless of whether or not the topic included in the message published by the UE is included in the second topic list of the message exchange server.

15. The UE of claim 14, wherein the controller is further configured to calculate the topic based on a current location of the UE.

16. The UE of claim 14, wherein the IP address is displayed after the UE has exited a first management area of the message exchange server and entered into a second management area of the adjacent message exchange server.

17. The UE of claim 14, wherein the message is a Message Queuing Telemetry Transport (MQTT) Control Packet set as Reserved Control Packet Type=0.

\* \* \* \* \*